United States Patent [19]

Stratton

[11] 4,418,105
[45] Nov. 29, 1983

[54] DOUBLE-COATED TAPE CONSTRUCTION HAVING AN IDENTIFIABLE EXTENDED LINER

[75] Inventor: James A. Stratton, Mahtomedi, Minn.

[73] Assignee: Minnesota Mining and Manufacturing Company, St. Paul, Minn.

[21] Appl. No.: 303,952

[22] Filed: Sep. 21, 1981

Related U.S. Application Data

[63] Continuation of Ser. No. 124,212, Feb. 25, 1980, abandoned.

[51] Int. Cl.³ ............................................. B32B 3/02
[52] U.S. Cl. ......................................... 428/40; 428/77;
428/81; 428/192; 428/354; 428/906
[58] Field of Search ......................... 428/40, 41, 43, 47,
428/51, 77, 81, 192, 352, 354, 343, 906;
206/411; 427/208, 208.4; 156/249, 247, 344,
289

[56] References Cited

U.S. PATENT DOCUMENTS

| | | | |
|---|---|---|---|
| 2,614,350 | 10/1952 | Kneifel et al. | 40/10 |
| 2,904,917 | 9/1959 | Sidorov et al. | 41/10 |
| 2,906,397 | 9/1959 | Simmons | 206/56 |
| 3,221,427 | 12/1965 | Kaplan | 40/2 R |
| 3,674,286 | 7/1972 | Dodgson | 282/11 |
| 3,958,051 | 5/1976 | Smith | 428/42 |
| 4,061,808 | 12/1977 | Sato | 428/40 X |

Primary Examiner—Alexander S. Thomas
Attorney, Agent, or Firm—Donald M. Sell; James A. Smith; John C. Barnes

[57] ABSTRACT

A tape construction having a pressure sensitive adhesive coating on both sides of a backing, and a release liner covering one adhesive surface thereon. Wherein the release liner has an extended portion to facilitate its removal and wherein the extended portion has a wave-shaped outer edge to facilitate its identification.

3 Claims, 6 Drawing Figures

DOUBLE-COATED TAPE CONSTRUCTION HAVING AN IDENTIFIABLE EXTENDED LINER

This is a continuation of application Ser. No. 124,212 filed Feb. 25, 1980 now abandoned.

BACKGROUND OF THE INVENTION

This invention relates to an adhesive tape assembly including a backing having a pressure sensitive adhesive coating covering its top and bottom surfaces and a release liner covering and extending beyond at least one edge of one of the adhesive-coated surfaces.

Double-coated adhesive tape constructions are commonly used for attaching together various objects, e.g. floor tile or carpeting to a floor. These double-coated tape constructions generally require a release liner over one of the adhesive-coated surfaces to facilitate winding the lengths of the tape construction into rolls and to facilitate dispensing and applying the uncovered adhesive surface of sections or smaller lengths of these tape rolls to various objects. After affixing one of the adhesive surfaces to an object, the release liner can be removed to expose the other adhesive surface, and allow a second object to be attached thereon. To facilitate the removal of this release liner, the tape constructions often employ the technique of extending the release liner beyond one or both edges of the adhesive-coated backing. This extended edge provides a free or unattached tab which can be grasped in order to peel away the liner from the adhesive-coated backing. It is often difficult, however, to detect which edge of the tape construction has this extended liner. This is especially true where the tape construction is being utilized in square sections, and where the extended liner could be on any one of the four edges of the section. In this situation, the user is required to randomly pick at the various edges of the tape construction until the extended liner is found. This random picking is not only time consuming, but in certain applications can actually delaminate the tape and degrade, if not destroy the desired adhesion.

A technique for locating this extended liner is not as simplistic as one might assume, e.g. simply printing identification markings on the exposed side of the liner is not an effective solution. This is because the technique or construction utilized must be amenable to conventional manufacturing technology, which must, for example, afford the possibility to change tape widths during the manufacturing process. This is not the case with a preprinted liner where the markings indicating edge lines necessarily are at pre-defined intervals. In fact, any printing on the liner is difficult because of coatings on the liner which diminish its permeability so as to provide its release characteristics for the adhesive coatings, and which also diminish any printing capabilities.

SUMMARY OF THE INVENTION

This invention comprises a double-coated adhesive tape construction having an easily locatable and identifiable extended liner which can be manufactured utilizing conventional manufacturing technology and methods allowing a change in tape widths during the manufacturing process and affording a reduction in the materials utilized and the resulting manufacturing cost.

This invention comprises a double-coated adhesive tape construction having an extended liner which has been slit with a modified knife to incorporate a wave-shaped outer edge on the extended portion of the liner. This wave-shaped outer edge facilitates not only the easy identification of the edge of the tape assembly having the extended liner, but also lessens the quantity of raw materials utilized during the manufacturing process. This latter advantage is not readily apparent. Since the purpose of the extended liner is to provide a tab or graspable portion on the tape construction, there must necessarily be adequate material or surface area available to provide this function. There is, however, no need to provide this graspable excess of liner along the entire length of the tape construction. The use of a wave-shaped edge profile affords a sufficient width of material for grasping the liner during the crested area of the wave-shaped edge while minimizing the liner present in the valleys of the wave-shaped profile, i.e. between crests. Since tape constructions are conventionally manufactured by slitting adjacent strips from a larger width web, it is possible for the space between crests of one strip or length of tape to provide the crest or extended liner of the adjacent strip or length of tape. This overlap affords a reduction by approximately one-half of the amount of liner which must exist between strips of adhesive-coated backing when for example a separate length of material for grasping is extended along the entire length of each of the strips.

DESCRIPTION OF THE ACCOMPANYING DRAWING

These advantages in the structure of the present invention will become more apparent when described with reference to the accompanying drawing wherein.

DETAILED DESCRIPTION OF THE PREFERRED EMBODIMENT

Figure 1:
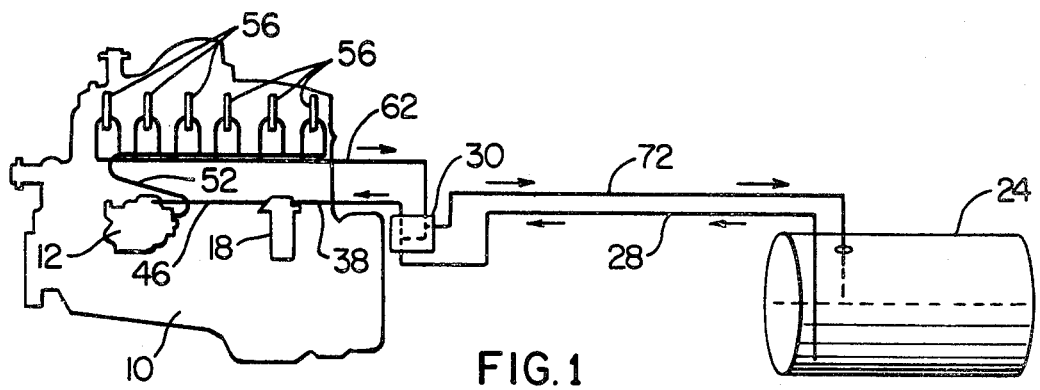
FIG. 1 is a partial top view of a portion of the web from which the present invention is manufactured.

The double-coated adhesive tape 10 of the present invention comprises a backing 12 typically a paper, foam or a film having a thickness in the range of 1 to 5 mils. Through conventional techniques a pressure sensitive adhesive 14 is coated onto a first side of the backing 12 and a release liner 16, usually a silicone coated paper, is applied to the exposed adhesive surface. A second pressure sensitive adhesive coating 15 is then applied to the second side of the backing 12.

Figure 2:
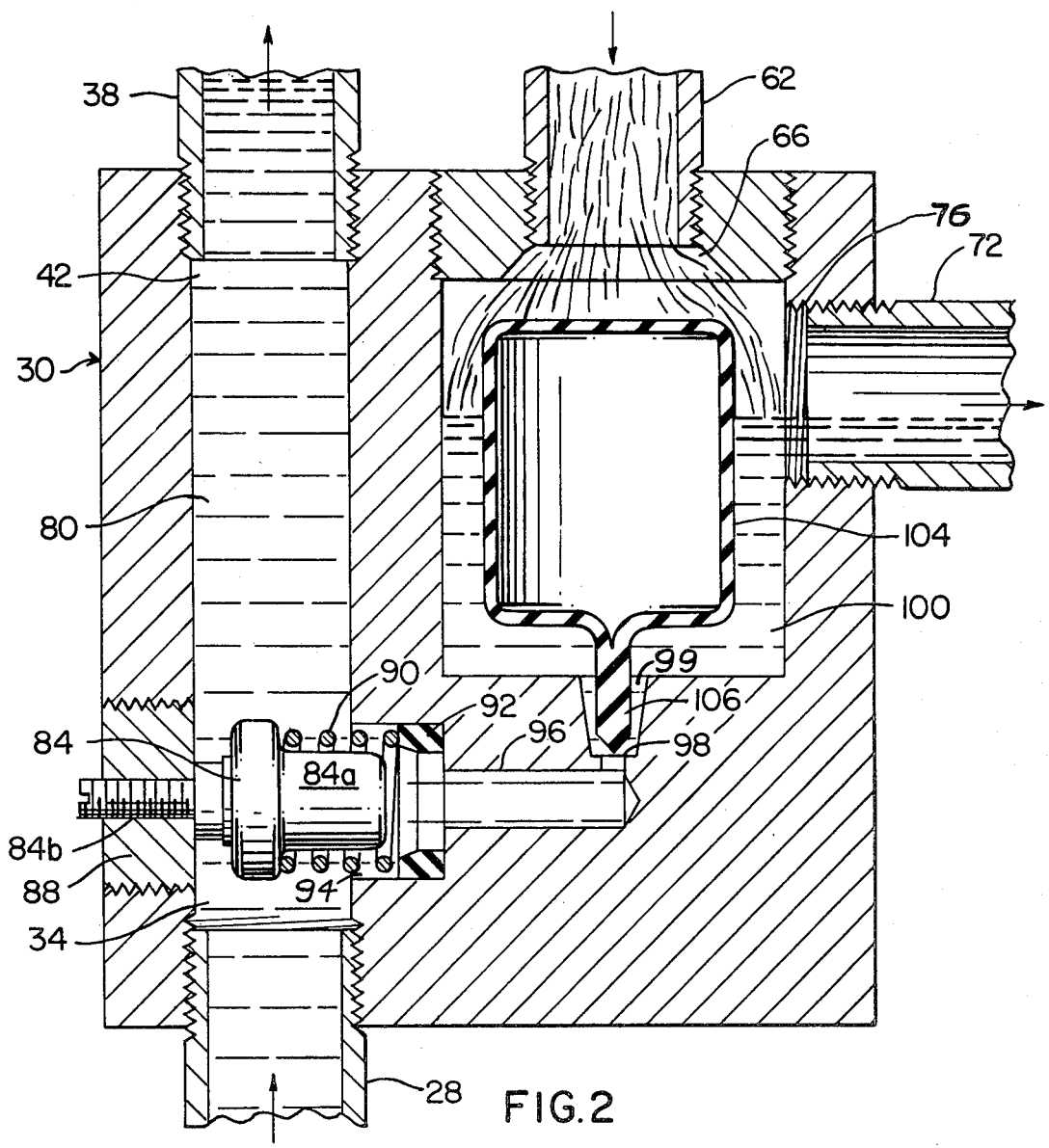
FIG. 2 is a cross section taken along line 2—2 of FIG. 1 illustrating the invention in an early stage of manufacture.
Figure 1:
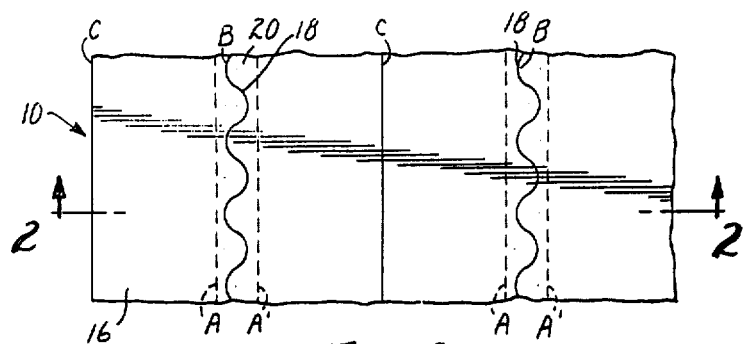
Figure 2:
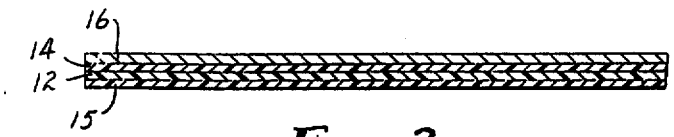
Figure 3:
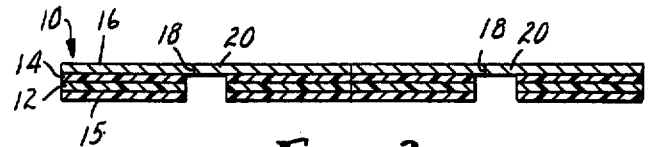
FIG. 3 illustrates the cross section of FIG. 2 in a later stage of manufacture.

The tape assembly as thus far described is manufactured into a web many centimeters wide and many meters long (See FIG. 2). This web is normally slit into individual strips having more appropriate dimensions for its utilization. This is accomplished through controlled depth slitting techniques as described in U.S. Pat. No. 3,368,669, also assigned to Minnesota Mining & Manufacturing and incorporated herein by reference. These techniques allow the adhesive coatings 14 and 15 and the backing 12 to be slit without slitting the release liner 16. This control depth slitting occurs at various intervals across the web width as illustrated by lines A and A' of FIG. 1. The strips between lines A and A' consisting of the adhesive coatings 14 and 15 on the backing 12 are then peeled back and removed. The spacing between lines A and A' is typically from 4 to 6 millimeters which, following the removal of the strips, provides a section of exposed liner 16 which can be further converted into the extended liner portion of the tape construction 10. The removed strip formerly between lines A and A' is discarded as waste.

Figure 6:
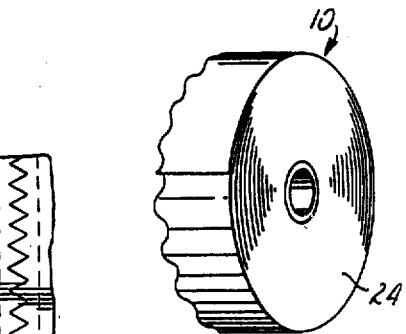
FIG. 6 illustrates a convolutely wound roll of the tape construction according to the present invention.

A further converting process slits the tape along line B and line C of FIG. 1. The slitting along line B is accomplished with a modified slitter knife such that the resulting slit edge or extreme edge has a wave-shaped profile. This wave-shaped profile affords the easy identification and the location of the extended liner. The slitting along line C is accomplished with a conventional slitting knife. The sections of tape between lines C and B, and B and C are wound up into finished convoluted rolls 24 (See FIG. 6) of the adhesive tape construction 10 according to the present invention. It can be observed that the tape construction 10 can be slit into various widths as required by the end users, by simply relocating the position of the slitting knives. At any width selected the wave-shaped outer edge 18 will still identify the extended liner portion 20 of the tape construction 10.

Figure 5:
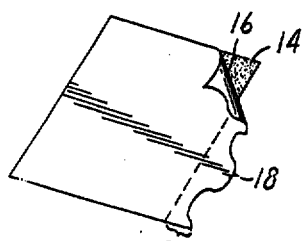
FIG. 5 illustrates an application of the present invention.

As previously described, the wave-shaped outer profile 18 affords the easy identification of the side of the tape construction 10 having the extended liner 20 upon which there is no adhesive coating. Once identified, this extended liner portion 20 can be used as a tab to remove the release liner 16 from an applied section of the tape construction 10 according to the present invention (FIG. 5).

A wave-shaped outer profile was chosen because it not only afforded easy identification of the edge having the extended liner, but it also afforded a savings of the materials and the associated cost of manufacture for this product. A certain minimum distance, for example, three millimeters, is required in order to grasp the extended liner portion 20 of the tape construction 10. With an extended liner having a straight edge profile and manufactured as described, the distance between line A and line A' would have to be twice this minimum distance, e.g. 6 millimeters. With a wave-shaped outer profile, the distance between lines A and A' can be reduced from two times the value of the minimum tab distance to exactly the minimum tab distance. This would be the case when lines A and A' are tangent to the crests and valleys of the resulting wave shaped profile 18. When this is the case, the minimum tab portion of 3 millimeters is still present within the various crested portions along the length of each of the extended liners, i.e. the crest of the extended liner on one section of adhesive tape assembly 10 is the valley between the crests of the extended liner on the adjacent strip of adhesive tape assembly 10. For ease in the manufacture of this product, only a portion however of the total possible savings of liner is utilized with the resulting distance between lines A and A' being somewhere between this minimum distance, and two times that distance as described above.

Figure 4:
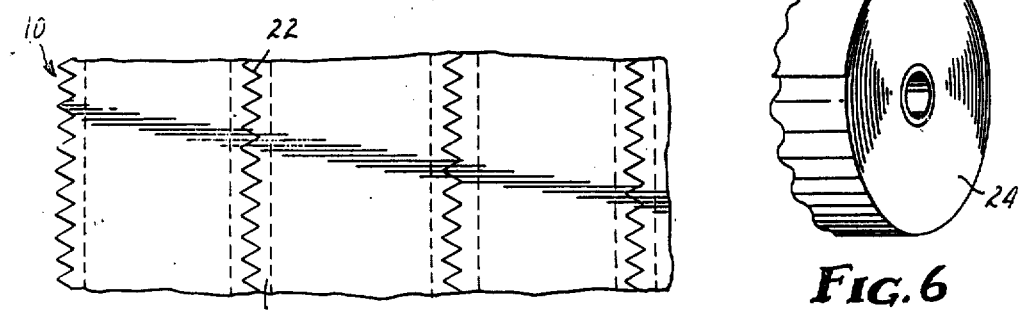
FIG. 4 is an alternate embodiment of the present invention.

FIG. 4 illustrates an alternate embodiment of the present invention. In this embodiment, a triangular wave profile 22 is illustrated instead of the sinusoidal wave profile 18 as in FIG. 1. The triangular wave profile 22 still provides the advantages as described above. FIG. 4 also illustrates an extended liner and a wave-shaped profile occurring on both eges of the adhesive tape assembly 10. This is accomplished by utilizing a modified converter knife when slitting along both lines B and C of FIG. 1.

Having thus described a preferred embodiment of this invention, it is apparent that various changes may occur in the dimensions and shapes described without departing from the spirit of the present invention.

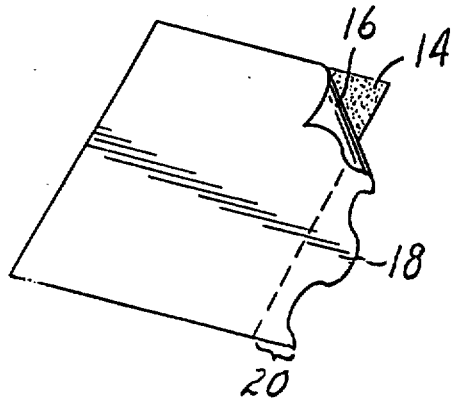

What is claimed:

1. An adhesive tape assembly including a backing having a pressure sensitive adhesive coating covering its top and its bottom surfaces and a release liner covering one of said adhesive coatings, wherein one edge of said release liner is co-linear with said backing along one edge of said backing, and the opposing edge of said release liner extends laterally beyond the other edge of said backing so as to afford a tab portion for removing said release liner from said backing, and wherein said extended edge of said release liner has a different outer profile than said co-linear edge, with said outer profile of said extended edge being wave-shaped so as to afford its easy identification and location.

2. An adhesive tape assembly as claimed in claim 1 wherein said wave-shaped profile is generally sinusoidal.

3. An adhesive tape assembly as claimed in claim 1 wherein said wave-shaped profile is generally triangular.

* * * * *

UNITED STATES PATENT AND TRADEMARK OFFICE
CERTIFICATE OF CORRECTION

PATENT NO. : 4,418,105

DATED : November 29, 1983

INVENTOR(S) : James A. Stratton

It is certified that error appears in the above-identified patent and that said Letters Patent is hereby corrected as shown below:

The title page and sheet 1 of the drawings containing Figs. 1,2,3,4,5 and 6 should appear as shown on the the attached sheets.

Signed and Sealed this

Eighth Day of May 1984

[SEAL]

Attest:

GERALD J. MOSSINGHOFF

Attesting Officer

Commissioner of Patents and Trademarks

United States Patent [19]

Stratton

[11] 4,418,105
[45] Nov. 29, 1983

[54] DOUBLE-COATED TAPE CONSTRUCTION HAVING AN IDENTIFIABLE EXTENDED LINER

[75] Inventor: James A. Stratton, Mahtomedi, Minn.

[73] Assignee: Minnesota Mining and Manufacturing Company, St. Paul, Minn.

[21] Appl. No.: 303,952

[22] Filed: Sep. 21, 1981

Related U.S. Application Data

[63] Continuation of Ser. No. 124,212, Feb. 25, 1980, abandoned.

[51] Int. Cl.³ .............................................. B32B 3/02
[52] U.S. Cl. .................................. 428/40; 428/77; 428/81; 428/192; 428/354; 428/906
[58] Field of Search ............... 428/40, 41, 43, 47, 428/51, 77, 81, 192, 352, 354, 343, 906; 206/411; 427/208, 208.4; 156/249, 247, 344, 289

[56] References Cited

U.S. PATENT DOCUMENTS

| | | | |
|---|---|---|---|
| 2,614,350 | 10/1952 | Kneifel et al. | 40/10 |
| 2,904,917 | 9/1959 | Sidorov et al. | 41/10 |
| 2,906,397 | 9/1959 | Simmons | 206/56 |
| 3,221,427 | 12/1965 | Kaplan | 40/2 R |
| 3,674,286 | 7/1972 | Dodgson | 282/11 |
| 3,958,051 | 5/1976 | Smith | 428/42 |
| 4,061,808 | 12/1977 | Sato | 428/40 X |

*Primary Examiner*—Alexander S. Thomas
*Attorney, Agent, or Firm*—Donald M. Sell; James A. Smith; John C. Barnes

[57] ABSTRACT

A tape construction having a pressure sensitive adhesive coating on both sides of a backing, and a release liner covering one adhesive surface thereon. Wherein the release liner has an extended portion to facilitate its removal and wherein the extended portion has a wave-shaped outer edge to facilitate its identification.

3 Claims, 6 Drawing Figures